US007751956B2

(12) United States Patent
Groer et al.

(10) Patent No.: US 7,751,956 B2

(45) Date of Patent: Jul. 6, 2010

(54) DISTRIBUTED AUTOMOTIVE DIAGNOSTIC SYSTEM WITH A SINGLE DIAGNOSTIC PROTOCOL SERVER AND MULTIPLE DATA SOURCE MODULES FOR INTERNAL COMBUSTION ENGINES

(75) Inventors: Frank Steffen Groer, Stuttgart (DE); Tomislav Ivo Golub, Birmingham, MI (US)

(73) Assignee: Detroit Diesel Corporation, Detroit, MI (US)

(*) Notice: Subject to any disclaimer, the term of this patent is extended or adjusted under 35 U.S.C. 154(b) by 245 days.

(21) Appl. No.: 11/939,676

(22) Filed: Nov. 14, 2007

(65) Prior Publication Data

US 2008/0161993 A1 Jul. 3, 2008

Related U.S. Application Data

(60) Provisional application No. 60/877,964, filed on Dec. 29, 2006.

(51) Int. Cl.
*G01M 17/00* (2006.01)

(52) U.S. Cl. .......................................................... 701/33

(58) Field of Classification Search .................. 701/29, 701/33-35; 700/21-31
See application file for complete search history.

(56) References Cited

U.S. PATENT DOCUMENTS

| | | | | |
|---|---|---|---|---|
| 5,550,762 | A | 8/1996 | Doll | |
| 5,606,315 | A | 2/1997 | Gaskins | |
| 5,884,202 | A | 3/1999 | Arjomand | |
| 5,916,287 | A | 6/1999 | Arjomand et al. | |
| 6,115,653 | A | 9/2000 | Bergstrom et al. | |
| 6,430,164 | B1 | 8/2002 | Jones et al. | |
| 6,487,717 | B1 | 11/2002 | Brunemann et al. | |
| 6,549,972 | B1 | 4/2003 | Berstis et al. | |
| 6,604,032 | B1 | 8/2003 | Moller et al. | |
| 6,718,425 | B1 | 4/2004 | Pajakowski et al. | |
| 6,748,536 | B1 | 6/2004 | Madau | |
| 6,772,061 | B1 | 8/2004 | Berthiaume et al. | |
| 6,823,457 | B1 | 11/2004 | Berstis et al. | |
| 2002/0161820 | A1 | 10/2002 | Pellegrino et al. | |
| 2004/0034460 | A1* | 2/2004 | Folkerts et al. | 701/54 |
| 2004/0095255 | A1 | 5/2004 | Namaky et al. | |
| 2004/0164206 | A1* | 8/2004 | Jammu et al. | 246/167 R |
| 2006/0226702 | A1 | 10/2006 | Ando | |

* cited by examiner

*Primary Examiner*—Kim T Nguyen
(74) *Attorney, Agent, or Firm*—Bill C. Panagos; Rader, Fishman & Grauer, PLLC

(57) ABSTRACT

A diagnostic system with a single diagnostic protocol server and multiple data source modules for an electronically controlled internal combustion engine.

6 Claims, 3 Drawing Sheets

DISTRIBUTED AUTOMOTIVE DIAGNOSTIC SYSTEM WITH A SINGLE DIAGNOSTIC PROTOCOL SERVER AND MULTIPLE DATA SOURCE MODULES FOR INTERNAL COMBUSTION ENGINES

CROSS-REFERENCE TO RELATED APPLICATIONS

This application claims the benefit and priority of U.S. Provisional Application Ser. No. 60/877,964 filed on Dec. 29, 2006 entitled "Distributed automotive diagnostic system with a single diagnostic protocol server and multiple data course modules". Said application is incorporated herein by reference in its entirety.

BACKGROUND OF THE INVENTION

1. Field of the Invention

The present invention relates to a distributed diagnostic system with a single diagnostic protocol server and multiple data source modules for internal combustion engines.

The present invention further relates to an Engine Control Unit comprised of at least two modules, namely a Common Powertrain Controller (CPC2) and a Motor Control Module (MCM) in electronic communication with each other. Each module is located with compatible, minimum version of software to enable the CPC2 to understand diagnostic trouble codes (DTC) from the MCM without the necessity of translating the CMC DTC's to CPC2 DTC.

The present invention is further related to a CPC2/CMC diagnostic system in which a single module (CPC2) has a rate of a diagnostic gateway (i.e., it is the only module communicating diagnostic information and SAE data links) while the other module (MCM or equivalent) communicates a reduced set of diagnostic information to the gateway module (CPC2) which then interprets and expands the information before making it available on the SAE links. This approach ensures that a time gap of no more than 1 to 2 seconds exists from failure detection on a remote data source module to the actual failure reporting from a gateway module.

2. Description of the Related Art

Berstis, et al. U.S. Pat. No. 6,549,972 discloses a method for providing control access between a device on a non-proprietary bus and a device on a proprietary bus. A gateway controller is connected between a proprietary bus and a non-proprietary bus. A message originated from a device on the non-proprietary bus intended for a device on the proprietary bus is checked by the gateway controller to determine if a transmission of the message should be permitted according to a permitted message bitmap. The permitted message bitmap contains a list of devices on the non-proprietary bus that are previously registered as able to communicate with devices on the proprietary bus and a list of permitted messages associated with each of the devices on the non-proprietary bus. The transmission of the message to the device on the proprietary bus is denied if the message is not registered within the permitted message bitmap.

Berstis, et al., U.S. Pat. No. 6,823,457 is a method for verifying control accesses between a device on a non-proprietary bus and a device on a proprietary bus. A gateway controller is connected between a proprietary bus and a non-proprietary bus. A determination is made as to whether or not a non-proprietary device is registered to more than one gateway controller. In response to a determination that the non-proprietary device is registered to more than one gateway controller, another determination is made as to whether or not the non-proprietary device is a portable device. In response to a determination that the non-proprietary device is a portable device, another determination is made as to whether or not a number of acceptable duplication has been exceeded. In response to a determination that the number of acceptable duplication has been exceeded, a flag is set to indicate a control access violation has occurred.

Pellegrino, et al. U.S. Publication No. 2002/0161820 discloses a computer implemented translation system that provides a programming interface between a client and a remote device that is connected to a vehicle data network. The translation device presents programmers with a uniform extraction of vehicle networks that permits programming and diagnostic procedures to be carried out without reference by the programmer to nuances of the particular network class used and on the motor vehicle. Three major interfaces are defined to implement the invention. The network interface incorporates a plurality of functions representing a model of a physical network. A data link interface responsive to client request requiring a network instance corresponding to a physical network from the network interface. The establishment of a network instance may involve reference to a database to obtain appropriate drivers for the underlying physical network represented by the network instance. A remote device interface incorporates a plurality of functions representing the physical devices capable through the network interface and handles messages between the client and the physical device attached to the underlying physical network.

BRIEF SUMMARY OF THE INVENTION

The present invention is a diagnostic system with a single diagnostic protocol server and multiple data source modules for an electronically controller internal combustion engine. The invention includes a first programmable module wherein memory and at least one table of an engine operation parameters resident therein and at least a second module in electronic communication with said first module; said second module having memory and at least one table of engine operation parameters resident therein; and each said module programmed with a minimum version of software with engine operation parameters and fault codes.

The first module provides access to a service tool for accessing information, the second module is in electronic communication with various system sensors for receipt of data signals from sensor indicators of operating conditions; at least a said second module communicating faults to said first module said first module logs said faults and communicates said faults to a service tool for diagnosis and service.

DETAILED DESCRIPTION OF THE PREFERRED EMBODIMENT(S)

Figure 1:
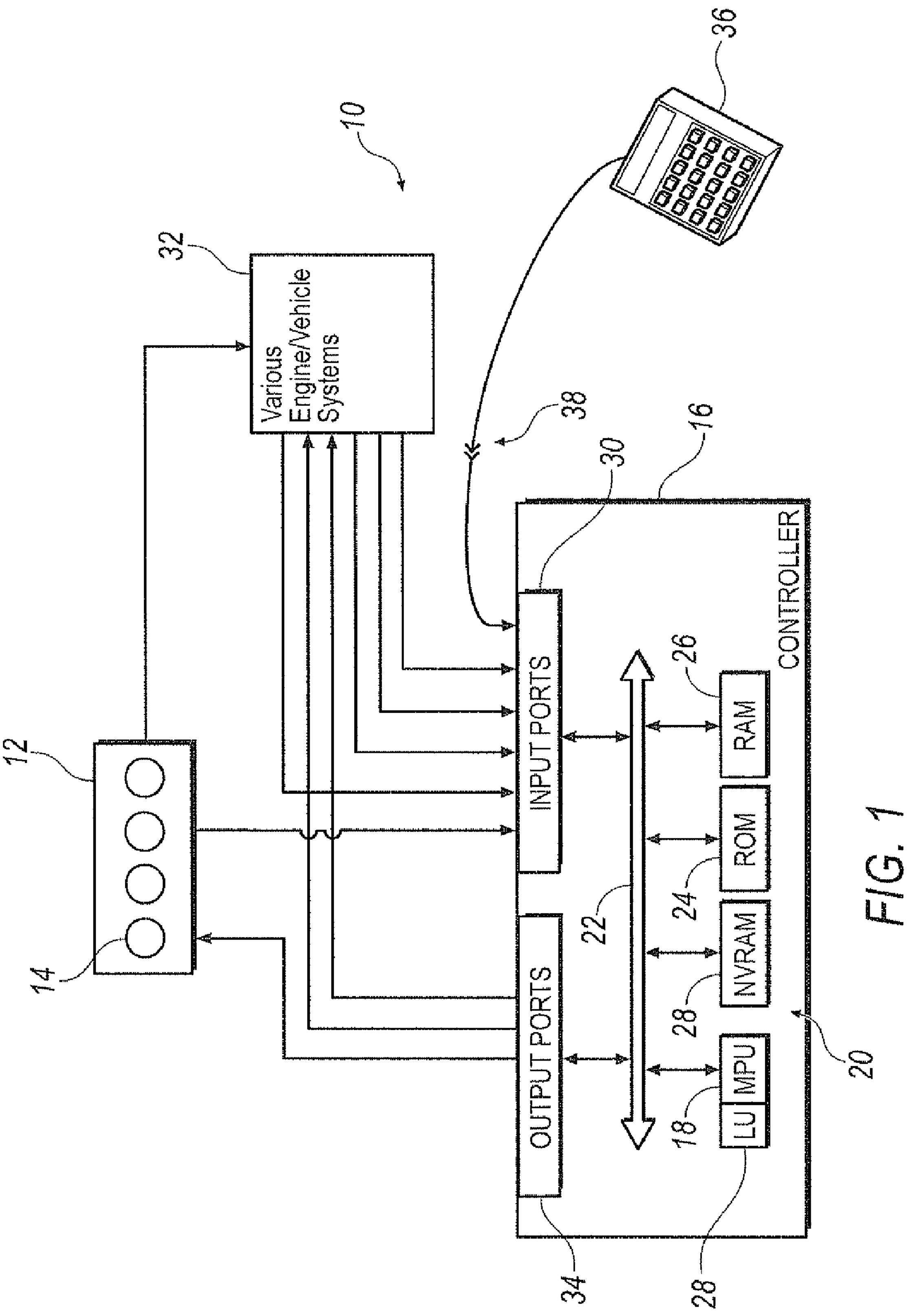
FIG. 1 is a schematic representation of an engine together with an electronic control unit and a diagnostic tool.

Turning now to the drawings where like numeral depict like structures and particularly to FIG. 1, there is schematically represented a perspective view illustrating a compression-ignition internal combustion engine system 10 incorporating various features according to the present invention is shown. The engine 12 may be implemented in a wide variety of applications including on-highway trucks, construction equipment, marine vessels, stationary generators, pumping stations, and the like. The engine 12 generally includes a plurality of cylinders disposed below a corresponding cover, indicated generally by reference numeral 14.

In a preferred embodiment, the engine 10 is a multi-cylinder compression ignition internal combustion engine, such as a 3, 4, 6, 8, 12, 16, or 24 cylinder diesel engine. However, the engine 12 may be implemented having any appropriate number of cylinders 14, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankin cycle, Miller cycle, etc.) using an appropriate fuel to meet the design criteria of a particular application.

A controller 16 preferably comprises a programmable microprocessor 18 in communication with (i.e., coupled to) various computer readable storage media 20 via at least one data and control bus 22. The computer readable storage media 20 may include any of a number of devices such as read only memory (ROM) 24, random access memory (RAM) 26, and non-volatile (keep-alive) random access memory (NVRAM) 28.

The various types of computer-readable storage media 20 generally provide short-term and long-term storage of data (e.g., at least one lookup table, LUT, at least one operation control routine, at least one mathematical model for EGR control, etc.) used by the controller 16 to control the engine 10. The computer-readable storage media 20 may be implemented by any of a number of known physical devices capable of storing data representing instructions executable by the microprocessor 18. Such devices may include PROM, EPROM, EEPROM, flash memory, and the like in addition to various magnetic, optical, and combination media capable of temporary and permanent data storage.

The computer-readable storage media 20 may include data representing program instructions (e.g., software), calibrations, routines, steps, methods, blocks, operations, operating variables, and the like used in connection with associated hardware to control the various systems and subsystems of the engine 10, and the vehicle. The computer readable storage media 20 generally have instructions stored thereon that may be executable by the controller 16 to control the internal combustion engine 10. The program instructions may direct the controller 16 to control the various systems and subsystems of the vehicle where the engine 12 is implemented, with the instructions being executed by microprocessor 20, and optionally, instructions may also be executed by any number of logic units 28. The input ports 30 may receive signals from the various engine and vehicle systems, including sensors and switches generally designated at 32, and the controller 16 may generate signals (e.g., the signals ACT and ADJ) at output ports 34. The output signals are generally presented (or transmitted) to the various vehicle components.

A data, diagnostics, and programming interface 36 may also be selectively connected to the controller 32 via a bus and connector 38 to exchange various information therebetween. The interface 36 may be used to change values within the computer readable storage media 20, such as configuration settings, calibration variables, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 36 selectively connected via an appropriate plug or connector 38 to the controller 16.

Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 16 may receive signals from the various vehicle sensors and switches, and execute control logic embedded in hardware and software to control the engine 12, various engine and vehicle systems 32, and the like. In one example, the controller 16 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 16, in addition to and by any of the various systems and subsystems of the vehicle or other installation where the controller 16 is implemented. Yet further, although in a preferred embodiment, the controller 16 includes the microprocessor 20, any of a number of known programming and processing techniques, algorithms, steps, blocks, processes, routines, strategies and the like may be implemented to control the engine 12, and the various engine and vehicle components 32. Further, the engine controller 16 may receive information in a variety of ways. For example, engine 12 systems information may be received over a data link, at a digital input, or at a sensor input of the engine controller 16.

Figure 2:
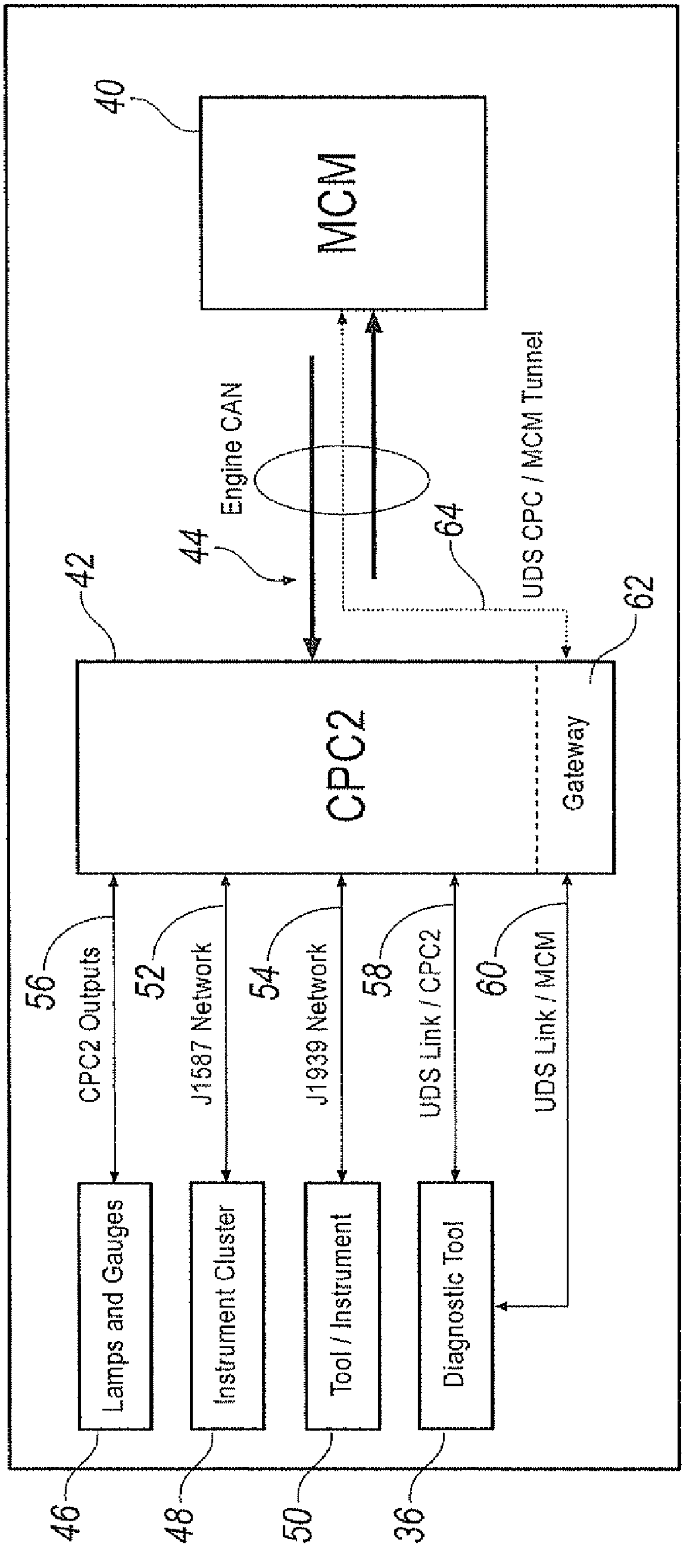
FIG. 2 is a detached schematic view of the ECU, showing the Common Powertrain Controller, the Motor Control Module and some of the respective electronic connections.

FIG. 2 is a detailed schematic view of the ECU, showing the Common Powertrain Controller, the Motor Control Module and some of their respective electronic connections.

Specifically, ECU16 is comprised of at least, Common Powertrain Controller (CPC2) 40 and Motor Control Module (MCM) 42 in electronic communication over an engine computer area network (ECAN) 44. The MCM and CPC2 preferably utilize a unified diagnostic server (VDS) protocol over the ECAN data link. The MCM is in electronic communication with various auxiliary systems, each of which is associated with the operation of engine and vehicle over a computer area network. The communication between the CPC2 and the MCM is two way and constant. Within the CPC2 is a data synchronization table 46 that acts as the gateway between a diagnostic tool 36 and the MCM. The gateway table is synchronized over the UDS to a diagnostic table 48 resident in the MCM at every ignition cycle. The CDC is electronically connected to the lamps and gauges 50, instrument cluster 52, tools and instruments 54 and diagnostic tools 36. The CPC2 communicates with the lamps and gauges, instrument cluster, and the common area network (CAN) 56, over SAE data links J1587 and SAE data link J1939, labeled 58 and 60, respectively. The diagnostic tool is in electronic communication with the CPC2 via the UDS data link 62. In addition the diagnostic tool is in electronic communication via a UDS data link with the MCM through the diagnostic gateway 64. The gateway is in communication with the MCM DTC table 66 and, synchronizes the DTC tables in the CPC2 with the MCM at each ignition cycle. Generally, the feature is enable or any time USE LEGACY FCM TABLE_FIG-U1 calibrations cleared or otherwise disabled. The CPC2 and the MCM are programmed with minimum versions of software supporting an automated DTC.

Figure 3:
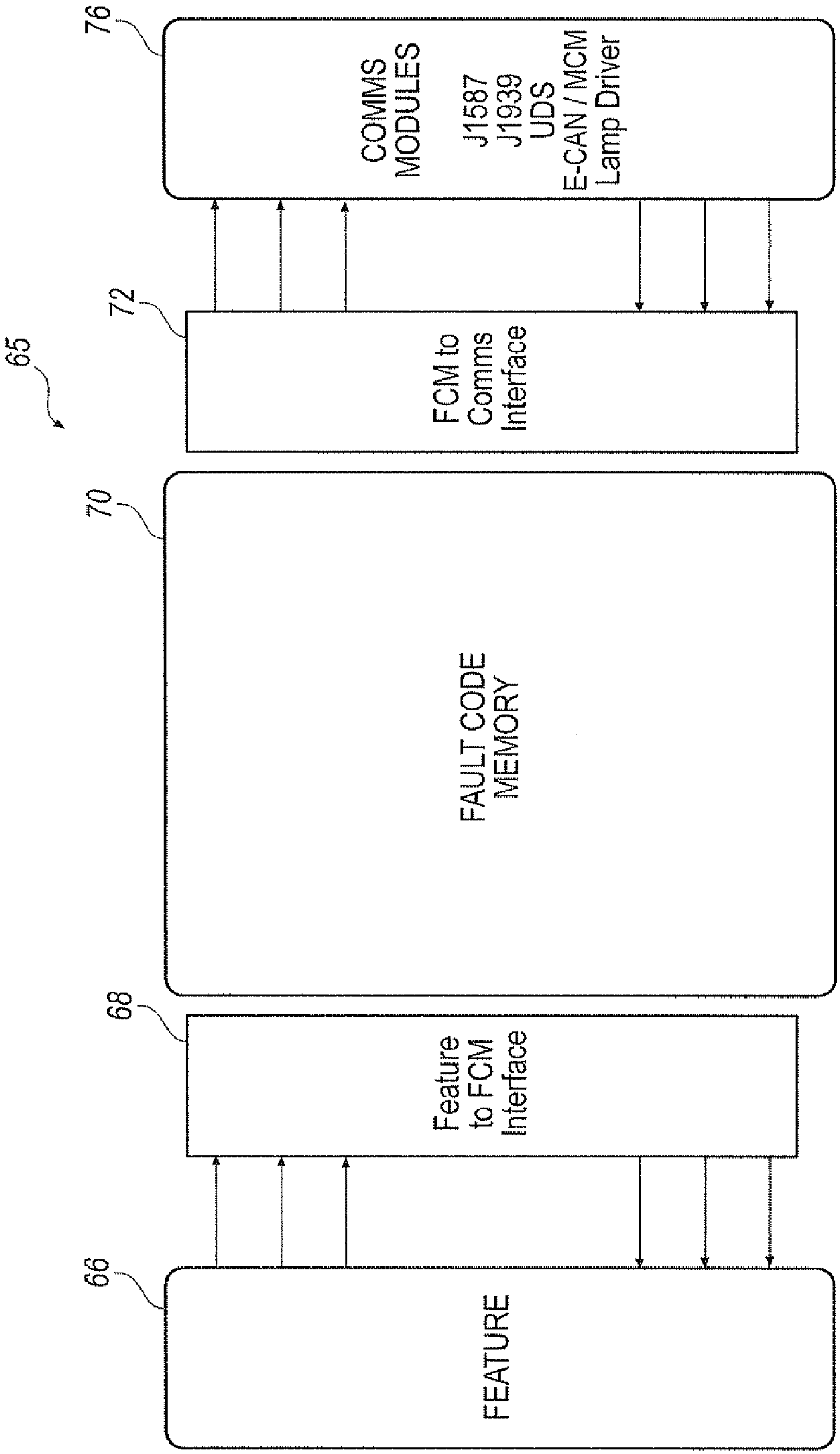
FIG. 3 is a schematic view of a Fault Control Module resident in the CPC2 of FIG. 2.

FIG. 3 is a schematic representation of the fault code memory manager resident in the CPC2. A similar Fault Code Memory Manager Module may be resident in the MCM. The fault code memory manager tracks and stores faults in memory that are received by each MPU 18 (as seen in FIG. 1) and a system that the MPU is monitoring. Those skilled in the art will recognize that while only one MPU is schematically presented in FIG. 1, it is understood that multiple MPUs may be present, each MPU monitoring a different system of the vehicle or engine, such as EGR, Engine Speed, Engine Torque, Engine coolant temperature, Engine Boost Pressure, Engine Percent Load, Vehicle Speed as well as other engine operating systems and parameters.

The Fault Code Manager Administrator Module 65 interfaces to the individual features 66 through an interface 68 to evaluate conditions and periodically provide status of each individual fault condition. These fault conditions are indicated by fault condition status flags, then processed and debounced in the Fault Code Module 70 internal logic based upon a configurable set or other rules. Once the faults are logged, they are kept and maintained in memory in a fault table which can then sent out on all communication links through the communications link 72 to the modules such as the CPC 2, or the MCM, or both, designated as 76. This communication may be is over J 1587/J1939 SAE data links, or the ECAN, or a UDS link. Additional interfaces back to features and LGR module allows the engine system behavior to change depending on the active faults. The FCM system component may include any number of monitoring units (MU) and preferably, the CPC2 Fault Control Module contains approximately 200 CPC2 defined MUs and any number of monitoring units (MU) in the MCM, and preferably approximately 500 MCM defined MUs. The faults are debounced prior to being transmitted to ensure that each fault is indicative of current operating conditions, and not an error or an anomaly. The MCM debounced faults are updated once per second via the ECAN, and the CPC2 MUs are internally evaluated 10 times per second.

The feature shall be enabled any time UseLegacyFCMTable_fig_u1 calibration flag is cleared (FALSE) and disabled otherwise.

Under normal operation, UseLegacyFCMTable_fig_u1 flag is set to FALSE (default value) and the static fault code memory synchronization feature is enabled. For feature to work both CPC2 and the MCM controllers must be programmed to minimum version supporting an automated DTC transfer. In the situations when the CPC2 software version which support the automated DTC synchronization are used with the older MCM versions which do not, it is expected that user sets the UseLegacyFCMTable_fig_u1 flag to TRUE. This will disable the automated synchronization feature and the CPC2 shall use the legacy static fault code table from the last known CMC version which does not support the auto-synch. The last known good version of the MCM static fault table is stored in program space ROM at the compile-time and shall be periodically updated in order to add new CMC MUID names for CPC2 use. It should be noted that this feature is incompatible with any MCM versions older than V6.3 since these have old FCM static tables which do not coincide with the presently stores V7.1. Therefore, it is recommended that this version of the CPC software not be coupled with any CMC version older than V6.3.

Successful execution of this static FCM data synchronization feature is a pre-requisite for the CPC2s ability to report the MCM faults. CPC2 shall preclude reporting any MCM failures to any communication devices or displays as a result of MCM failures until the static DTC table synchronization is completed or has been aborted. Under these circumstances CPC2 shall also exclude/delay logging any DM1* related failures. Reporting of the DM1* delivered lamp information is allowed and supported even during the data synchronization process. (Other lamp status communication methods are also supported during the synchronization, but these fall outside of the scope of this feature.) In general the activation of dashboard lamps is allowed regardless of the success or failure of the static fault info synchronization process. Under normal operating conditions, this synchronization can take up to 60 seconds. Synchronization is required to occur only if MCM reports and FCM version number/checksum is different from the one stored in CPC2. This is expected to be the case only after one of the two controllers (CPC2 or MCM) has been replaced or reprogrammed.

If the feature is enabled and the synchronization is needed but cannot complete, or if the MCM static fault code table version cannot be obtained CPC2 shall log a fault (below) after which the processing DM1* messages shall be aborted for the duration of the ignition cycle (with the exception of the lamp status information). (i.e. CPC2 is unable to obtain accurate MCM fault code information and is unable to act as an FCM gateway.)

At the beginning of each ignition cycle, (just or shortly after ECAN link to MCM has been established) CPC2 shall read the current MCM static fault code table version via UDS service routine detailed below. If no response (or an invalid response) for this request is received within 600 ms, the CPC shall repeat the request two more times, with 500 ms gaps in between. If the response is still not received, CPC2 shall wait for 3 seconds and repeat the above request sequence. Finally, if no response is received, the CPC shall activate the Static MCM Fault Code Memory Unavailable failure and abort the static memory synchronization request for the duration of the ignition cycle. (DM1* processing is also aborted.)

If CPC2 receives a valid response to the MCM version request, it shall compare the newly communicated version to an internally stored value (initially set to 0) and if either of the two version components plus checksum do not match, CPC2 shall commence the synchronization process via UDS service routine detailed below. If the CPC2 box is new or any time after an EEPROM reset or after the execution of "Set Parameter to Default" service routine the non-volatile elements containing the MCM version information shall be set to 0.

In order to download the MCM's static fault code table, CPC2 shall loop the UDS service $52 routine from 0 (first valid MCM MUID to "MCM MAX MUID"). CPC2 is to accept all MCM sent data without a range check so that the checksum can be properly verified. A range-check is to be performed over all data values just prior to the data usage. If any of the provided values fall outside of the allowed range, CPC shall log the "Invalid MCM Static DTC Data Range" fault. Any value falling outside of the valid range shall be limited to the maximum valid value.

While downloading, CPC2 shall add each received byte to the CRC16 checksum in order to finally compare the checksum of the entire received table against the one provided by MCM in the version information. (Only first 1000 fault are includes.) Should the two checksums not match, CPC2 shall repeat the entire synchronization sequence starting with the version request. If after the second attempt the CRC16 checksums still do not match, the CPC2 shall abort the synchronization process and log the "Static MCM Fault CRC Fault".

Should the checksums, however, match the CPC2 controller shall commence writing of the entire MCM static table to non-volatile memory, followed by non-volatile storage of the new version and checksum information. At this point the download process is deemed successful and the processing of the DM1* messages is allowed to resume.

Upon the next ignition cycle, CPC2 shall recover the static fault table from Flash and in the process shall re-compute the checksum. Should this computed value not match the one stored with the MCM version information, CPC2 shall commence the new download sequence. This will ensure that any errors which might have occurred during the flash write in the previous cycle are corrected. (It is conceivable that the table flash write might not complete under all circumstances, e.g., a battery power is disconnected, etc. The static table is large and writing will take time.) In addition, any possible CPC2 flash corruptions can be automatically alleviated.

Following the successful internal checksum comparison, CPC2 shall request the previously described version information from MCM. If a valid response to this version request is received and the newly communicated version information with checksum is identical to the internally stored set of values, CPC2 shall deem the synchronization process complete. From this point on the evaluation of the DM1* messages is allowed to commence. (No new download is required.)

CPC2 stores the MCM static fault code table version number, total number of MCM faults and the static table checksum in the nonvolatile memory.

CPC2 shall be able to store at least 1000 static MCM MUIDs, but may be configures to store any number within hardware capability. If MCM is reporting more than a thousand MUIDS the following fault code shall be logged "Insufficient Static Fault Code Storage Memory". Activation of this "silent" fault (no lamps) shall not preclude the first 1000 MCM faults to be downloaded and used. (i.e., the CPC2 controller shall behave as if the number of faults equal to 1000 was sent, but the fault shall be logged.) Once any MCM failures with MUIDs exceeding 1000 are sent via DM1* message, CPC2 shall in addition log the existing "DM1*Unknown MUID" fault. The "Insufficient Storage" fault is logged only to indicate that a CPC2 software upgrade is required. Under normal circumstances this fault is not expected to occur since MCM team shall continue to communicate any major FCM changes and additions to the CPC2 software team.

Any time after the synchronization process is aborted for any reason, and is later allowed to resume, CPC2 shall repeat the entire sequence beginning with the request for version information.

MCM shall store the static fault code table version information (Version+Total Number of faults) as constant data in read-only memory. The FCM table version number is a positive, non-zero integer ranging from 1 to 0xFFFE. Version number is incremented every time even a single static FCM memory byte is updated or added. Any reported values falling outside of specified range shall be considered invalid or unavailable.

For the initial implementation the total number of faults shall be equal to the MAX_MCM_MUID+1 (since 0 is a valid MUID). This implies that no static memory table gaps are allowed. Once the MCM implements the MUID changes outlined below, this connection will be lost the MAX MUID number sent could be greater than the number of faults. The MCM shall no longer equate the MUID with the row index of the MU control table. Instead each element of the MCM MU control table shall be expanded by two bytes indicating the MUID which once assigned shall no longer be altered. This design medication of the MCM fault control system is necessary since it ensures that the MUID of a fault does not change with possible static fault code memory shifts and rearrangements. This in turn is essential since CPC2 control logic requires accurate fault status of specific MCM MUIDs. If these are arranged in the MCM fault code memory, CPC2 will end up monitoring unintended failure codes.

MCM shall compute the checksum over the first 1000 entries of the static fault code memory table plus the version block minus the checksum fields at start of each ignition cycle. This checksum value shall be reported together with other version information in UDS service routine $51. The checksum shall be computed using the standard CRC16 algorithm. No response to service routine $51 shall be given until the checksum computation is completed. (If the checksum computation is not finished aid the request is received, the request is simply dropped.) MCM shall not respond to an old (outdated) request at a later time.

If for any reason CPC is unable to receive the MCM fault code table version or the table synchronization process has been aborted (e.g. the ECAN link to MCM has been severed, the UDS connection cannot be established, no reply to the MCM DTC table version request is received, etc. . . . ) the CPC2 shall log the following fault code:

Static MCM Fault Code Memory Unavailable. The environmental condition for this and all below faults is the UseLegacyFCMTable_fig_u1 calibration set to FALSE. Once logged this fault shall latch active for the duration of the ignition cycle. The following additional fault parameters are specified: Timer Type NONE, de-bounce time 0, recover time infinite 0xFFFF, healing time 15 minutes. When active the fault shall illuminate the CEL lamp. This fault code shall be used as an exclusion condition for all existing DM1* failures.

Invalid MCM Static DTC Data Range fault is activated whenever MCM provides the static fault data falling outside the valid range. The fault shall not illuminate CEL, but shall be logged active for the duration of the ignition cycle. It indicates an inconstancy with the MCM static fault table which must be corrected with the new build of the MCM software.

Insufficient Static Fault Code Storage Memory fault is activated when MCM reports the number of faults exceeding the maximum which CPC2 is able to accept (1000). However, those skilled in the art recognize that the umber of faults the CPC2 may accept can be any number within the hardware capability of the CPC2. Once logged it is latched active of the duration of the ignition cycle. The following additional fault parameters are specified: Timer Type NONE, de-bounce time 0, recover time 0xFFFF, healing time 15 minutes. When active, the fault shall not illuminate any lamps.

Static MCM Fault Data CRC Fault is logged whenever the MCM is reporting the static FCM table checksum information which does not match the CPC2 computed checksum. Once logged it is latched active for the duration of the ignition cycle. The following additional fault parameters are specified: Timer Type NON, de-bounce time 0, recovery time 0xFFFF, healing time 15 minutes. When active the fault shall illuminate CEL lamp.

Static FCM Fault Data Download Timeout fault is logged whenever the download process exceeds MCMStaticDTCTableSynchTimeout_u8 minutes since the beginning of the ignition cycle. Once logged it is latched active for the duration of the ignition cycle. The following additional fault parameters are specified: Time Type NONE, de-bounce time 0, recover time 0xFFFF infinite, healing time 15 minutes. When active the fault shall illuminate CEL lamp. When active, further download attempts and the processing of the DM1* message are aborted.

While the invention has been described as stated herein, the words used in this description are not to be construed as words of limitation. Those skilled in the art recognize many variations and medication are possible without degrading from the scope and spirit of the invention as set forth in the appended claims.

What is claimed as new and desired to be protected by Letters Patent of the United States is:

1. A diagnostic system with a single diagnostic protocol server and multiple data source modules for an electronically controlled internal combustion engine having an electronic controller with memory, comprising:

a first programmable module, said first module wherein memory and at least one table of engine operation parameters resident therein;

at least a second module in electronic communication with said first module; said second module having memory and at least one table of engine operation parameters resident therein;

each said module programmed with a minimum version of software with engine operation parameters and fault codes;

said first module providing access to a service toll for accessing information at least said second module in electronic communication with various system sensors for receipt of data signals form said sensor indicators of operating conditions; at least a said second module communicating faults to said first module said first module logs said faults and communicates said faults to a service tool for diagnosis and service.

2. The system of claim 1, wherein said system recalibrates said modules to compatible software version to synchronize automated code memory between said modules each ignition cycle.

3. The system of claim 1, wherein said first module is a common powertrain controller and said second module is a motor control module, both of which comprise an electronic control unit for said engine.

4. The system of claim 1, wherein said first module receives fault information from said second module over a CAN based network.

5. The system of claim 1, wherein said first module reports at least one fault from said second module over a JAE J1587 data link and an SAE J1939 data link.

6. The system of claim 1, wherein said data in said tables are diagnostic trouble codes.

* * * * *